United States Patent
Sinz

(10) Patent No.: US 7,038,473 B2
(45) Date of Patent: May 2, 2006

(54) METHOD AND APPARATUS FOR MEASURING A FLUID LEVEL AND A MOTOR VEHICLE PROVIDED WITH SUCH APPARATUS

(75) Inventor: Wolfgang Sinz, Sulzbach (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/496,923

(22) PCT Filed: Oct. 23, 2002

(86) PCT No.: PCT/EP02/11857

§ 371 (c)(1),
(2), (4) Date: May 27, 2004

(87) PCT Pub. No.: WO03/048698

PCT Pub. Date: Jun. 12, 2003

(65) Prior Publication Data

US 2005/0001636 A1 Jan. 6, 2005

(30) Foreign Application Priority Data

Dec. 3, 2001 (EP) .................................. 01128751

(51) Int. Cl.
*G01R 27/14* (2006.01)
(52) U.S. Cl. ........................................ 324/716; 73/317
(58) Field of Classification Search .................. 73/317, 73/304 R, 290 R, 305, 311–314; 340/625; 324/207.25, 207.11, 207.16, 714, 716; 338/33, 338/185
See application file for complete search history.

(56) References Cited

U.S. PATENT DOCUMENTS

| 4,803,420 | A | 2/1989 | Steinbrecher et al. ....... 324/716 |
| 4,911,011 | A * | 3/1990 | Fekete et al. ................. 73/313 |
| 4,931,764 | A | 6/1990 | Gaston ........................ 338/185 |
| 5,666,851 | A * | 9/1997 | Bacon .......................... 73/317 |
| 6,389,892 | B1 * | 5/2002 | Sato et al. ................. 73/304 R |

FOREIGN PATENT DOCUMENTS

DE    42 16 467 A1    12/1993

* cited by examiner

*Primary Examiner*—Vincent Q. Nguyen
(74) *Attorney, Agent, or Firm*—Richard A. Speer; Mayer, Brown, Rowe & Maw LLP

(57) ABSTRACT

A fluid level (26) is measured through determining an inclination angle of a bracket (32) that rotatably connects a floating member (34) located near a surface of the fluid to a pivoting arrangement (28, 30) which carries a resistor (40) of which a first part is branched off through a slider (42) moving along with a change in the angle. In particular, the following steps are executed. First, connecting a stabilized power supply (U0) with its first terminal in series with a limiting resistor (RV) to one end of the resistor (40); second, measuring the voltages over both the first part (UF) and over a remainder part (UE) of the resistor. Finally, calculating the resistance value of the first part (RX) through eliminating a contact resistance value (RU, 46) associated with the slider from the measurement equations given by the values of the respective voltages (UF, UE).

12 Claims, 2 Drawing Sheets

US 7,038,473 B2

METHOD AND APPARATUS FOR MEASURING A FLUID LEVEL AND A MOTOR VEHICLE PROVIDED WITH SUCH APPARATUS

BACKGROUND OF THE INVENTION

The invention relates to a method for measuring a fluid level through determining an inclination angle of a bracket that rotatably interconnects a floating member located near a surface of the fluid level to a pivoting arrangement, which carries a resistor facility of which a part is branched off through a slider that is moving along with a change in said angle.

The accurately determining of a fluid level in a container is of great importance in various environments, such as in particular, but not limited to, gasoline tanks in motor vehicles. The measurement arrangement must fulfill many and sometimes contradicting requirements. It must be inexpensive, be nearly insensitive against appreciable accelerations in all directions of the vehicle, both static and dynamic, must present no fire hazards in an environment with large volumes of highly combustible matter, and so on. Therefore, if such measurement is executed in an electrical manner, any voltages used must be as low as feasible. In practice, the measuring has been executed through measuring a variable resistance which will change under influence of the fluid level through the motion of the slider along a resistor track such as one executed in thick film technology. The mechanical aspects of such arrangement have been disclosed in U.S. Pat. No. 6,267,007 B1 assigned to Mannesmann VDO AG.

The measuring of the angle, and indirectly, of the remaining fluid content, therefore boils down to the measuring of a resistance value, one end of the resistor being connected in a fixed manner, and the sliding in effect constituting a moving contact. Two-wire measuring of such resistance value requires a measuring current to run through the sliding contact, so that the contact resistance may influence the measuring accuracy in an adverse manner. Moreover, the contact resistance may even on a short timescale vary over a wide range.

In consequence, amongst other things, it is an object of the present invention to diminish the value of the measuring current through the contact resistance, while furthermore providing an arrangement that allows to eliminate any influence of the contact resistance to an allowable low level.

BRIEF DESCRIPTION OF THE INVENTION

Now therefore, according to one of its aspects the method according to the invention is characterized by the following steps:
connecting a stabilized power supply with its first terminal in series with a limiting resistance to one end of the resistor, measuring the voltages over both said first part and over a remainder part of said resistor, and calculating the resistance value of said first part through eliminating a contact resistance value that is associated with said slider, from the measurement equations expressed by the values of said respective voltages.

Generally, the providing of two separate measuring values allows to straightforwardly eliminating the influence of the contact resistance on the calculations.

A method according to the invention is characterized by connecting a second terminal of said stabilized power supply to said slider.

Another method according to the invention is characterized by connecting measuring resistors in series with arrangements for measuring said respective voltages as respective measuring impedances.

Preferably, said measuring resistors are symmetrical. Another method according to the invention is characterized in that said resistor comprises a thick film resistance layer.

The invention also relates to an apparatus being arranged for measuring a fluid level, said apparatus comprising an inclinating bracket that rotatably connects a floating member to be located near a surface of the fluid to a pivoting arrangement that carries a resistor of which a first part is branched off through a slider moving along with a change in an angle of said inclinating. The apparatus according to the invention is characterized by a stabilized power supply connected with its first terminal in series with a limiting resistance to one end of the resistor, measuring means for measuring the voltages over both said first part and over a remainder part of said resistor, and calculating means for calculating the resistance value of said first part including eliminating a contact resistance value that is associated with said slider from the measurement equations expressed by the values of said respective voltages, and furthermore comprising output means for outputting a result of said calculating means.

A preferred embodiment of the apparatus according to the invention is characterized by a connection between a second terminal of said stabilized power supply and said slider.

Another embodiment of the apparatus according to the invention is characterized by measuring resistors interconnected in series with arrangements for measuring said respective voltages as measuring input resistances.

Yet another embodiment of the apparatus according to the invention is characterized in that said measuring resistors are symmetrical.

A further preferred embodiment of the apparatus according to the invention is characterized in that said resistor comprises a thick film resistance layer.

The invention furthermore relates to a motor vehicle. A motor vehicle according to the invention is characterized by presentation means for presenting an output signalization of said calculation means for further service to a user person or user entity.

Preferably, said apparatus is associated to a fuel tank facility.

Further advantageous aspects of the invention are recited in dependent claims.

BRIEF DESCRIPTION OF THE DRAWINGS

These and further aspects and advantages of the invention will be discussed more in detail hereinafter with reference to the disclosure of preferred embodiments, and in particular with reference to the appended Figures that show.

DETAILED DESCRIPTION OF THE INVENTION

Figure 1:
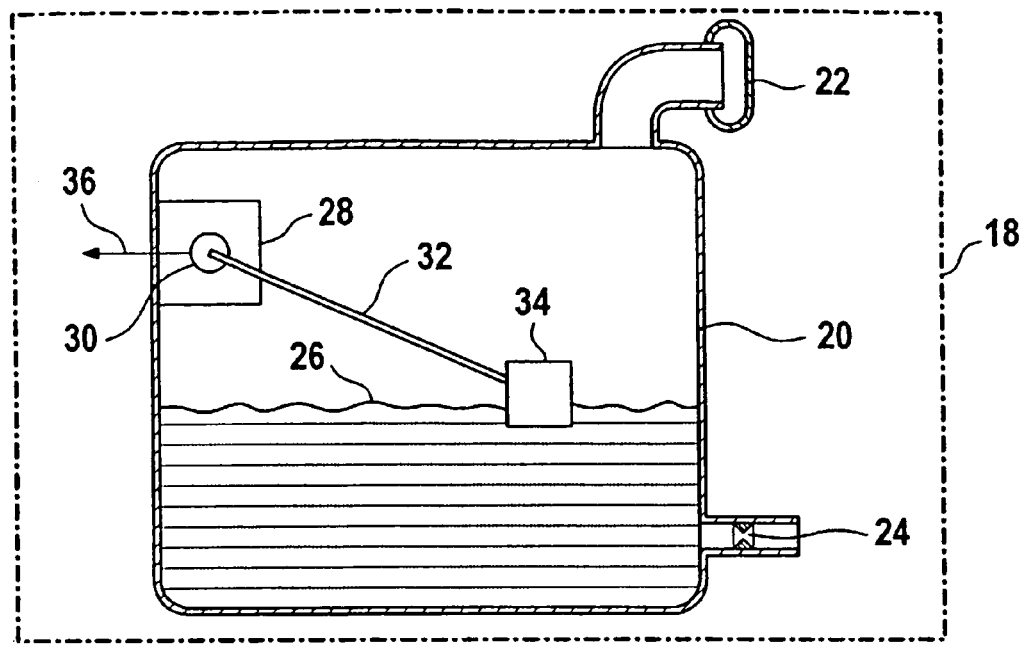
FIG. 1 an overall sketch of a measuring apparatus located in a motor vehicle.

FIG. 1 represents an overall sketch of a fluid level measuring apparatus located in a motor vehicle. The motor motor vehicle has been shown conceptually only in the form of a broken line rectangle 18. The motor vehicle contains a gasoline tank provided with a filling pipe with closing lid 22, and an output valve 24 leading to the motor. The position of fluid level 26 is sensed by a floating member 34 rotatably connected by bracket 32 to a pivoting arrangement 30. The latter by means of a support 28 that also carries the measuring arrangement proper, is fixed to the wall of the tank 20. An electric signal 36 representing the angular position of bracket 32, and therefore, of the vertical position of the fluid surface, is outputted for further analog or digital processing in a user entity, and/or for display or other presentation not shown to a user person. The bracket and pivot arrangement could in principle be submerged in the fluid, the fluid level then being relatively higher than as shown.

Figure 2:
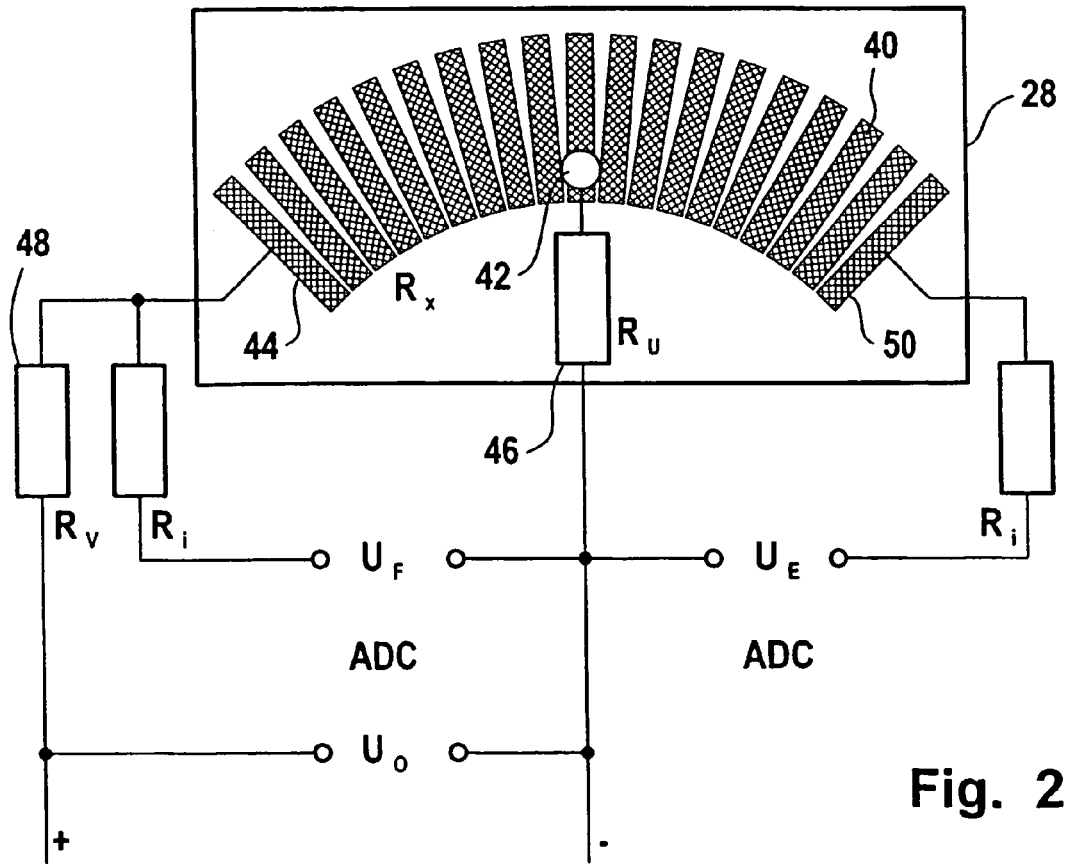
FIG. 2 a comprehensive illustration of the electrical measuring arrangement according to the present invention.

FIG. 2 represents a comprehensive illustration of the electrical measuring embodiment according to the present invention. The central element of the measuring is a thick film resistor arrangement 40 that has been shown as a discontinuous sequence of radial connecting strips overlaid over a curved strip of thick film resistance material applied to the support 28 that has been shown in FIG. 1. Therefore, the strips as shown may form taps of the underlying resistance. Another setup has the slider 42 contact the thick film resistance immediately. Slider 42 through its actual position determines an actual measuring resistance between the tap and first resistor end point 44. In principle, such resistance could be measured with a conventional two-wire measuring based on the expression V=I*R, wherein R is the resistance, I is the current in the resistance, and V is the voltage over the resistance. Herein, a stabilized power supply such as indicated by U0 and a series resistance RV for current limitation are provided. Furthermore, through analog-to-digital conversion, an appropriate digital value is generated for serving various digital data processing needs, and/or for immediate display. However, an inherent problem of the above arrangement is the transition resistance RU 46 that may in view of the non-negligible electrical current flowing through the contact, influence the measured voltage UF in an unpredictable and non-uniform manner.

Now, the present invention in the first place extends to a three-wire measurement organization. The extension is provided by a three-wire measuring arrangement that adds a second connecting wire to the second resistor end point 50. In this manner, the transition resistance RU in first instance will not influence the measurement, because under correct dimensioning it will carry only a negligible current.

The inventor has however recognized a problem in that the transition resistance RU 42 may then rise in an unexpected manner through the build-up of plaques and other high-resistance coverages on the thick film layer resistance and/or on the slider contact. It has been found that a low actual current value could aggravate the problem in that it could cause such build up to proceed relatively faster. In fact, regardless of the actually low current flowing within these layers, the effective voltage measured may then deviate so much from the correct value that malfunctioning of the measurement process and even malfunctioning of the whole motor vehicle may ensue, such as in the case where no more fluid is present at all, but the measuring result presented externally would still indicate a sufficient reserve fuel quantity. The inventor has recognized that such incorrectness in the resistance value is in fact promoted by the controlling of the overall apparatus with a low current that by itself would have raised attainable accuracy.

However, the present inventor has recognized that a three-wire differential measurement may determine the transition resistance and in consequence may on the basis thereof apply a correction to the measured value that introduces a much higher degree of accuracy regardless of the actual current flow through the contact resistance RU 42. The procedure is now to measure both voltage UF between a first end point 44 of the measuring resistor and the slider, and also voltage UE between a second end point 50 of the measuring resistor and the slider. Because of the stabilization of the power supply voltage U0, an elementary calculation will effectively remove the influence of the transition resistance. In this manner, an error-free measurement will be attained, as long as the transition resistance is lying in the range that is feasibly covered by the measurement instrument proper. This will remove the disadvantages of a transition contact that in essence does not carry substantial currents.

The applicable formulae are as follows:

$$UF=(RX+RU)*I=U0-RV*I \quad (1)$$

$$UE=RU*I \quad (2)$$

where $RU=UE/I$ and $I=(U0-UF)/RV$ \quad (3)

This leads to $RX=(UF-UE)*RV/(U0-UF)$ \quad (4)

Expression (4) indeed does not contain the actual value of the contact resistance RU anymore, so that plaques and other irregularities of the slider contact would no longer influence the measurement. Resistances Ri represent in effect the input impedances of the voltage measuring facility.

Figure 3:
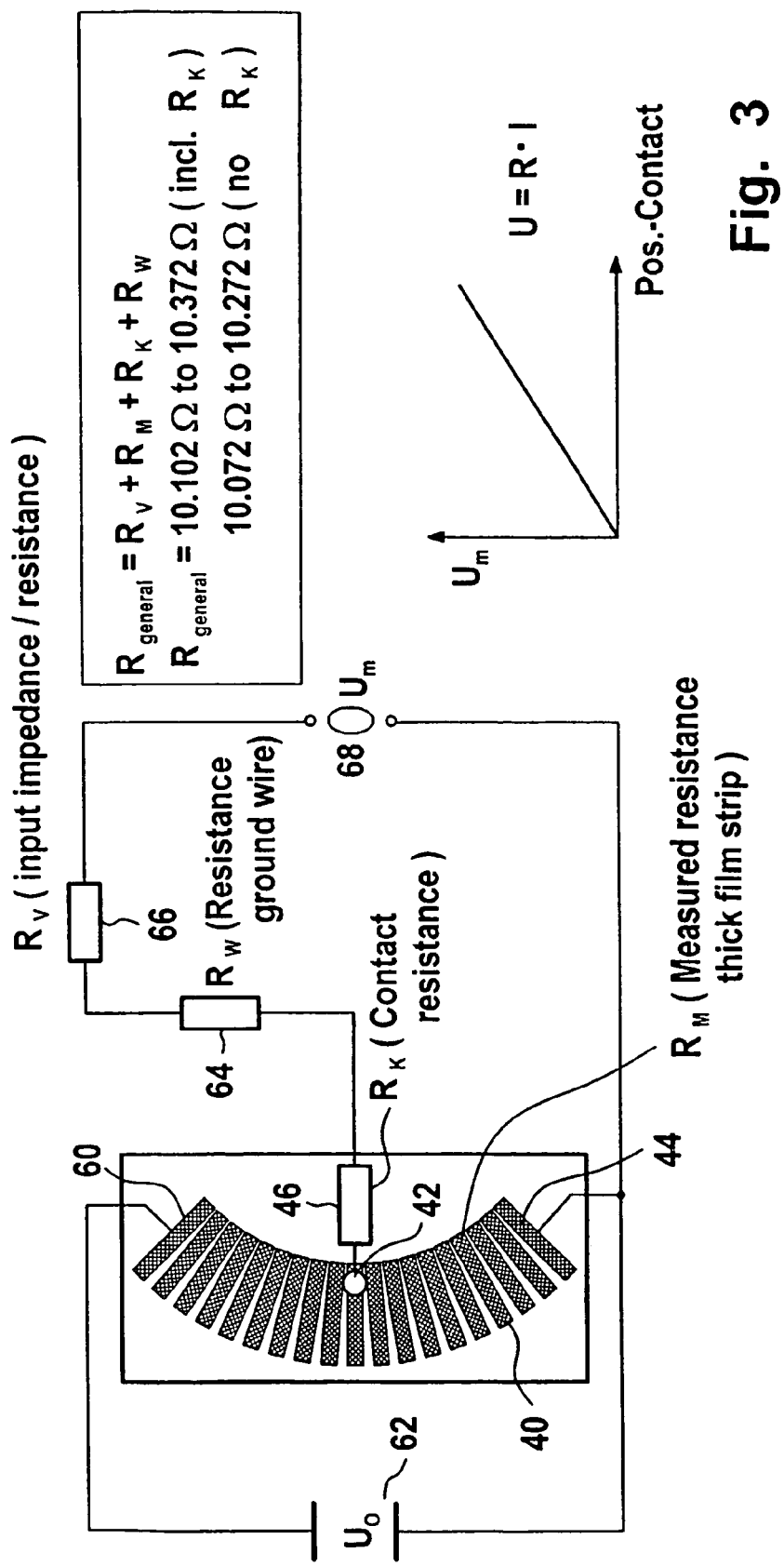
FIG. 3 another illustration of a potentiometer measuring arrangement along with quantitative dimensions of various resistances.

FIG. 3 illustrates another arrangement of a potentiometer measuring system along with quantitative dimensions of various resistances. In contradistinction to FIG. 2, power supply 62 is connected to both ends 44, 60 of thick film resistor arrangement 40. Slider contact 42 in association with contact resistance 46, notional resistance 64 presented by various interconnection wires, and high-value measuring resistance 66 constitute a loop with measuring arrangement 68. As shown, the thick film has an overall resistance varying between something like 70 and 270 ohms, the contact resistance RK varying between something like 30 and 100 ohms, the resistance of the various wires is of the order of 2 ohms, and the high impedance measuring resistance is in the order of 10,000 ohms. The overall resistance in the measuring loop then varies between 10,072 and 10,272 ohms without the contact resistance, and between 10,102 and 10,372 ohms with the variable contact resistance included. This is a clear indication on the great and detrimental influence that the variation of the contact resistance may have in the measured value, and which problem has been solved by the inventive embodiment discussed with, reference to FIG. 2, supra.

Now, the invention has been duly explained with reference to a preferred embodiment. However, persons skilled in the art will recognize numerous changes and modifications. Therefore, unless such changes and modifications would exceed the scope of the Claims appended hereto, they should be construed as being included in the invention.

The invention claimed is:

1. A method for measuring a fluid level by means of a rheostat having a resistor (40) that is connected in series at first and second end points (44, 50) with a stabilized power supply ($U_o$) and a limiting resistor ($R_V$) and having a float operated electrical contact that slides over the resistor, the method comprising:
(a) connecting the first and second end points and the sliding contact so that voltages ($U_F$) and ($U_E$) present between the electrical contact and the first and second end points, respectively, are to be determined;

(b) calculating the value of the voltages ($U_F$) and ($U_E$), utilizing in each case the resistance value ($R_U$) existing between the sliding contact and the resistor; and (c) thereafter calculating the resistance value ($R_X$) of that portion of the resistor located between the first resistor end point (44) and the sliding contact, using calculations in which the contact resistance value ($R_U$) is eliminated from the measurement equations expressed by the values of the voltages ($U_F$) and ($U_E$).

2. A method as claimed in claim 1, being characterized by connecting a second terminal of said stabilized power supply (U0) to said slider (42).

3. A method as claimed in claim 2, being characterized by connecting measuring resistors (Ri, Ri) in series with arrangements for measuring said respective voltages (UE, UF) as respective measuring impedances.

4. A method as claimed in claim 3, being characterized in that said measuring resistors are symmetrical.

5. A method as claimed in claim 1, being characterized in that said resistor comprises a thick film resistance layer.

6. A method as defined in claim 1, wherein calculation of the resistance RX is according to the formula:

$$RX = (UF - UE) \times RV / (UO - UF).$$

7. An apparatus for measuring a fluid level (26), said apparatus comprising an inclinating bracket (32) that rotatably connects a floating member (34) to be located near a surface of the fluid to a pivoting arrangement (28, 30) that carries a resistor (40) of which a first part (UF) is branched off from a remainder part (UE) through a slider (42) moving along with a change in an angle of said inclinating, said apparatus being characterized by comprising: a stabilized power supply (U0) connected with its first terminal in series with a limiting resistance (RV) to one end of the resistor (40), measuring means for measuring the voltages over both said first part (UF) and over a remainder part (UE) of said resistor, and calculating means for calculating the resistance value of said first part (RX) including eliminating without the inclusion of a contact resistance value (RU, 46) that is associated with said slider from the measurement equations expressed by the values of said respective voltages (UF, UE), and furthermore comprising output means for outputting a result of said calculating means.

8. An apparatus as claimed in claim 7, being characterized by a connection between a second terminal of said stabilized power supply (U0) and said slider (42).

9. An apparatus as claimed in claim 7, being characterized by measuring resistors (Ri, Ri) interconnected in series with arrangements for measuring said respective voltages (UE, UP) as measuring input resistances.

10. An apparatus as claimed in claim 9 being characterized in that said measuring resistors are symmetrical.

11. An apparatus as claimed in claim 7, being characterized in that said resistor comprises a thick film resistance layer.

12. An apparatus as defined in claim 7, wherein the calculating means includes means for performing the equation:

$$RX = (UF - UE) \times RV / (UO - UF).$$

* * * * *